United States Patent
Jacobs

(10) Patent No.: US 9,707,778 B2
(45) Date of Patent: Jul. 18, 2017

(54) BELT ON BELT SHEET TRANSPORT SYSTEM FOR A PRINTING SYSTEM

(71) Applicant: OCE-TECHNOLOGIES B.V., Venlo (NL)

(72) Inventor: Roy H. R. Jacobs, Venlo (NL)

(73) Assignee: OCE-TECHNOLOGIES B.V., Venlo (NL)

(*) Notice: Subject to any disclaimer, the term of this patent is extended or adjusted under 35 U.S.C. 154(b) by 0 days.

(21) Appl. No.: 15/229,350

(22) Filed: Aug. 5, 2016

(65) Prior Publication Data
US 2016/0339718 A1 Nov. 24, 2016

Related U.S. Application Data

(63) Continuation of application No. PCT/EP2015/052836, filed on Feb. 11, 2015.

(30) Foreign Application Priority Data

Feb. 21, 2014 (EP) .................... 14156082.1

(51) Int. Cl.
*B41J 11/00* (2006.01)
*B65H 29/16* (2006.01)
(Continued)

(52) U.S. Cl.
CPC ............ *B41J 11/007* (2013.01); *B41J 2/01* (2013.01); *B65G 15/48* (2013.01); *B65G 23/14* (2013.01); *B65H 5/021* (2013.01); *B65H 29/16* (2013.01); *B65H 29/242* (2013.01); *B65H 29/56* (2013.01); *B65G 15/62* (2013.01); *B65H 2404/251* (2013.01); *B65H 2404/252* (2013.01); *B65H 2404/26* (2013.01); *B65H 2404/264* (2013.01);
(Continued)

(58) Field of Classification Search
CPC B41J 11/007; B41J 2/01; B65G 15/48; B65G 23/14; B65G 15/62; B65H 5/021; B65H 29/16; B65H 29/242; B65H 29/56; B65H 2404/286; B65H 2406/33; B65H 2404/26; B65H 2801/15; B65H 2404/2691; B65H 2404/264; B65H 2404/251; G03G 2215/00683
See application file for complete search history.

(56) References Cited

U.S. PATENT DOCUMENTS

| | | | |
|---|---|---|---|
| 2007/0048035 A1* | 3/2007 | Baba ............ | G03G 15/2028 399/323 |
| 2008/0001347 A1 | 1/2008 | Krause et al. | |
| 2008/0239053 A1 | 10/2008 | Sakano | |

FOREIGN PATENT DOCUMENTS

| | | |
|---|---|---|
| JP | 58-16738 U | 2/1983 |
| JP | 2000-272779 A | 10/2000 |
| JP | 2000-355431 A | 12/2000 |

* cited by examiner

*Primary Examiner* — Bradley Thies
(74) *Attorney, Agent, or Firm* — Birch, Stewart, Kolasch & Birch, LLP

(57) ABSTRACT

A sheet transport system comprising an endless carrier belt that has a predetermined stiffness and is arranged to carry the sheets towards an end of a conveyer path where the sheet is separated from the carrier belt by passing this belt around a separating member that has a predetermined curvature, wherein the carrier belt runs in parallel with an endless conveyer that has a larger stiffness than the carrier belt and, at the end of the conveyer path, has a smaller curvature than the separating member.

13 Claims, 3 Drawing Sheets

(51) Int. Cl.
*B65H 29/24* (2006.01)
*B65H 29/56* (2006.01)
*B41J 2/01* (2006.01)
*B65G 15/48* (2006.01)
*B65H 5/02* (2006.01)
*B65G 23/14* (2006.01)
*B65G 15/62* (2006.01)

(52) U.S. Cl.
CPC ................ *B65H 2404/2691* (2013.01); *B65H 2404/286* (2013.01); *B65H 2406/33* (2013.01); *B65H 2801/15* (2013.01); *G03G 2215/00683* (2013.01)

BELT ON BELT SHEET TRANSPORT SYSTEM FOR A PRINTING SYSTEM

CROSS REFERENCE TO RELATED APPLICATIONS

This application is a Continuation of PCT International Application No. PCT/EP2015/052836, filed on Feb. 11, 2015, which claims priority under 35 U.S.C. 119(a) to patent application Ser. No. 14/156,082.1, filed in Europe on Feb. 21, 2014, all of which are hereby expressly incorporated by reference into the present application.

The invention relates to a sheet transport system comprising an endless carrier belt that has a predetermined stiffness and is arranged to carry the sheets towards an end of a conveyer path where the sheet is separated from the carrier belt by passing this belt around a separating member that has a predetermined curvature.

Sheet transport systems of this type are used for example for conveying media sheets through one or more processing stages of a copier or printer, e.g. an ink jet printer. For obtaining a high image quality, it is essential that the sheets are conveyed with high positional accuracy, so that for a given moment in time, e.g., the instant at which the nozzles of an ink jet print head fire, the position of the sheet relative to the print head is predictable with high accuracy in both the conveying direction and the direction transverse to the conveying direction. Consequently, the carrier belt should have a relatively high resistance against deformations in the plane of the belt, i.e. against stretching in the longitudinal conveying direction and against a shear type deformation that would result in a lateral deviation of the belt and the sheets. Consequently, the material of the carrier belt should be relatively stiff. It is therefore preferable to use a carrier belt that is made of a metal foil.

US 2008001347 A1 discloses a sheet transport system wherein the carrier belt is formed by a metal film that is coated with an electrically insulating layer to which an electrostatic charge may be applied for safely attracting the sheet against the belt. In addition, the belt may be perforated, and air may be sucked through the perforations so that the sheet is additionally sucked against the belt and, consequently is reliably held in position on the belt.

Similar sheet transport systems are disclosed in US 2008/239053 A1, JP S58 16738 U, and JP 2000 272779 A.

JP 2000 355431 shows a transport system with an endless carrier belt superposed on an endless conveyer belt.

At the end of the conveyer path the sheet must be separated from the carrier belt so that it may reliably be passed on to a subsequent conveyer, a discharge tray or the like. To that end, the carrier belt is typically passed around a separating member that has a relatively large curvature, i.e. a relatively small radius of curvature. The separating member may be formed by a roller which has a relative small radius. In particular, the radius should be so small that the sheet, which has a certain bending strength, cannot follow the curvature of the surface of the roller and is therefore separated from the roller.

However, especially when the media sheets are wetted (e.g. with ink) in one of the processing steps, the sheets become floppy and limp and tend to curl by themselves, so that it becomes difficult to reliably separate the sheets from the belt. In view of this problem, the radius of curvature of the separating member should be made as small as possible.

On the other hand, in view of the relatively high stiffness of the carrier belt, this increases the risk that the carrier belt is damaged when it is bent strongly to follow the curvature of the separating member. Even when the carrier belt is not damaged when it is passed over the separating member a single time, the repeated pass of the endless belt over the separating member may lead to fatigue and, eventually, damage of the belt.

It is therefore an object of the invention to provide a sheet transport system which combines a high lifetime with a reliable separation of the sheets from the carrier belt.

According to the invention, the carrier belt runs in parallel with an endless conveyer that has a larger stiffness than the carrier belt and, at the end of the conveyer path, has a smaller curvature than the separating member.

The larger stiffness of the conveyer prevents undesired distortions of the carrier belt and thereby assures a high positional accuracy of the sheets being conveyed. At the end of the conveyer path, however, the conveyer has a smaller curvature than the separating member and does therefore not pass over the separating member. Consequently, it is only the carrier belt that passes over the separating member. Since the stiffness of the carrier belt may be significantly lower than that of the conveyer, the curvature of the separating member can be made so large that the sheets are separated reliably and, on the other hand, no damage is caused to the carrier belt.

More specific embodiments and useful details of the invention are indicated in the dependent claims.

The conveyer may be formed by a rigid drum or, more preferably, by another endless belt that is made of a stiffer material, e.g. the metal film. In a preferred embodiment, the carrier belt is superposed on the conveyer, so that the relatively stiff conveyer supports the carrier belt and prevents distortion of the latter. As an alternative, the carrier belt and the conveyer (belt) may be disposed side by side and on the same level, at least in the portion of the conveyer path upstream of the end thereof. For example, a plurality of parallel carrier belts and conveyer belts may be interleaved with one another. In this example the sheet is supported directly on the conveyer belt and also directly on the carrier belt.

BRIEF DESCRIPTION OF THE DRAWINGS

The present invention will become more fully understood from the detailed description given herein below and accompanying schematic drawings which are given by way of illustration only and are not limitative of the invention, and wherein.

DETAILED DESCRIPTION

Printing Process

A printing process in which the sheet transport system according to the present invention may be suitably used is described with reference to the drawings.

Figure 1:
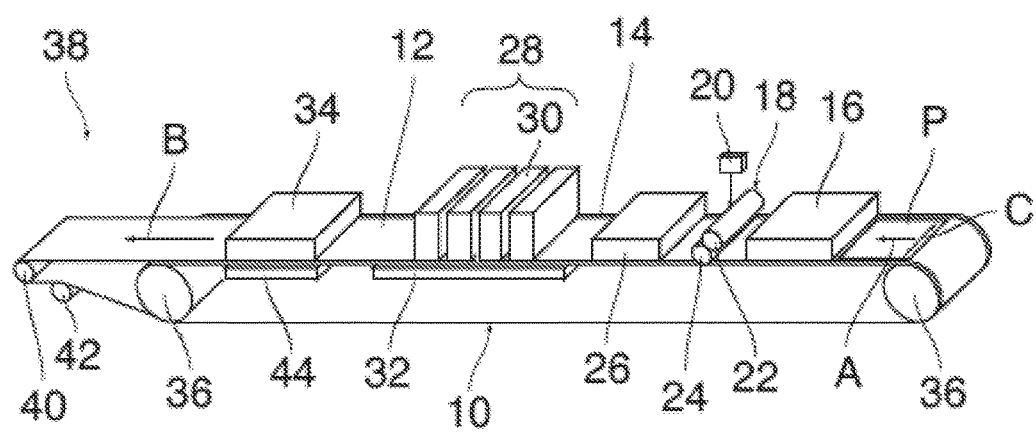
FIG. 1 shows a schematic representation of an inkjet printing system with a sheet transport system according to the invention.

FIG. 1 shows that a sheet P of a receiving medium, in particular a machine coated medium, is transported in a direction for conveyance as indicated by arrows A and B and with the aid of a sheet transport system 10. The transport system 10 comprises an endless carrier belt 12 superposed on an endless conveyer, which, in this example, is formed by another belt 14. Alternatively, the conveyer belt 14 may be exchanged for a conveyer drum. The conveyer may be suitably configured depending on the requirements (e.g. sheet registration accuracy) of the sheet transportation in each step of the printing process and may hence comprise a drum with a rigid surface. In the given example, where the belt 14 is used, the belt is preferably made of a stiff material, e.g. a metal foil that has a high resistance against deformation such as stretching in transport direction (arrows A and B) or bending (shearing) in transverse direction (double arrow C in FIG. 1). For a proper conveyance of the sheets of receiving medium, the sheets need to be fixed to the transport system 10. The way of fixation is not particularly limited and may be selected from electrostatic fixation, mechanical fixation (e.g. clamping) and vacuum fixation. Of these vacuum fixation is preferred.

The printing process as described below comprises of the following steps: media pre-treatment, image formation, drying and fixing and optionally post treatment.

Media Pre-Treatment

To improve the spreading and pinning (i.e. fixation of pigments and water-dispersed polymer particles) of the ink on the receiving medium, in particular on slow absorbing media, such as machine coated media, the receiving medium may be pretreated, i.e. treated prior to printing an image on the medium. The pre-treatment step may comprise one or more of the following:

preheating of the receiving medium to enhance spreading of the used ink on the receiving medium and/or to enhance absorption of the used ink into the receiving medium;

primer pre-treatment for increasing the surface tension of the receiving medium in order to improve the wettability of the receiving medium by the used ink and to control the stability of the dispersed solid fraction of the ink composition (i.e. pigments and dispersed polymer particles). Primer pre-treatment may be performed in the gas phase, e.g. with gaseous acids such as hydrochloric acid, sulfuric acid, acetic acid, phosphoric acid and lactic acid, or in the liquid phase by coating the receiving medium with a pre-treatment liquid. The pre-treatment liquid may comprise water as a solvent, one or more co-solvents, additives such as surfactants and at least one compound selected from a polyvalent metal salt, an acid and a cationic resin;

corona or plasma treatment.

Primer Pre-Treatment

As an application way of the pre-treatment liquid, any conventionally known methods can be used. Specific examples of an application way include: a roller coating, an ink-jet application, a curtain coating and a spray coating. There is no specific restriction in the number of times with which the pre-treatment liquid is applied. It may be applied at one time, or it may be applied in two times or more. Application in two times or more may be preferable, since cockling of the coated printing paper can be prevented and the film formed by the surface pre-treatment liquid will produce a uniform dry surface having no wrinkle by applying in 2 steps or more.

Especially a roller coating method is preferable because this coating method does not need to take into consideration of ejection properties and it can apply the pre-treatment liquid homogeneously to a recording medium. In addition, the amount of the applied pre-treatment liquid with a roller or with other means to a recording medium can be suitably adjusted by controlling: the physical properties of the pre-treatment liquid; and the contact pressure of a roller in a roller coater to the recording medium and the rotational speed of a roller in a roller coater which is used for a coater of the pre-treatment liquid. As an application area of the pre-treatment liquid, it may be possible to apply only to the printed portion, or to the entire surface of both the printed portion and the non-printed portion. However, when the pre-treatment liquid is applied only to the printed portion, unevenness may occur between the application area and a non-application area caused by swelling of cellulose contained in the coated printing paper with the water in the pre-treatment liquid followed by drying. Then, from the viewpoint of drying uniformly, it is preferable to apply a pre-treatment liquid to the entire surface of a coated printing paper, and roller coating can be preferably used as a coating method to the whole surface. The pre-treatment liquid may be an aqueous pre-treatment liquid.

Corona or Plasma Treatment

Corona or plasma treatment may be used as a pre-treatment step by exposing a sheet of a receiving medium to corona discharge or plasma treatment. In particular when used on media like polyethylene (PE) films, polypropylene (PP) films, polyetyleneterephtalate (PET) films and machine coated media, the adhesion and spreading of the ink can be improved by increasing the surface energy of the media. With machine coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbondioxide, methane, fluorine gas, argon, neon and mixtures thereof. Corona treatment in air is most preferred.

FIG. 1 shows that the sheet P of receiving medium may be conveyed to and passed through a first pre-treatment module 16, which module may comprise a pre-heater, for example a radiation heater, a corona/plasma treatment unit, a gaseous acid treatment unit or a combination of any of the above. Optionally and subsequently, a predetermined quantity of the pre-treatment liquid is applied on the surface of the receiving medium P at a pre-treatment liquid applying member 18. Specifically, the pre-treatment liquid is provided from storage tank 20 of the pre-treatment liquid to the pre-treatment liquid applying member 18 composed of double rolls 22 and 24. Each surface of the double rolls may be covered with a porous resin material such as sponge. After providing the pre-treatment liquid to auxiliary roll 22 first, the pre-treatment liquid is transferred to main roll 24, and a predetermined quantity is applied on the surface of the receiving medium P. Subsequently, the coated printing paper P on which the pre-treatment liquid was supplied may optionally be heated and dried by drying member 26 which is composed of a drying heater installed at the downstream position of the pre-treatment liquid applying member 18 in order to decrease the quantity of the water content in the pre-treatment liquid to a predetermined range. It is preferable to decrease the water content in an amount of 1.0 weight % to 30 weight % based on the total water content in the provided pre-treatment liquid provided on the receiving medium P.

To prevent the transport mechanism 10 from being contaminated with pre-treatment liquid, a cleaning unit (not shown) may be installed.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, an inkjet marking module 28 comprising four inkjet marking devices 30, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

An inkjet marking device 30 for use in single pass inkjet printing has a length of at least the width of the desired printing range. The inkjet marking device may comprise a single printhead having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of print heads.

In image formation by ejecting an ink, an inkjet head (i.e. print head) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 µm or less in the current image forming method.

FIG. 1 shows that after pre-treatment, the receiving medium P is conveyed to upstream part of the inkjet marking module 28. Then, image formation is carried out by each color ink ejecting from each inkjet marking device 30 arranged so that the whole width of the receiving medium P is covered.

Optionally, the image formation may be carried out while the receiving medium is temperature controlled. For this purpose a temperature control device 32 may be arranged to control the temperature of the surface of the transportation mechanism (e.g. belt or drum) underneath the inkjet marking module 28. The temperature control device 32 may be used to control the surface temperature of the receiving medium P, for example in the range of 30° C. to 60° C. The temperature control device 32 may comprise heaters, such as radiation heaters, and a cooling means, for example a cold blast, in order to control the surface temperature of the receiving medium within said range. Subsequently and while printing, the receiving medium P is conveyed to the downstream part of the inkjet marking module 28.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 34, which may comprise a heater, for example a radiation heater. After an image has been formed, the print is conveyed to and passed through the drying and fixing unit 34. The print is heated such that solvents present in the printed image, to a large extent water, evaporate. The speed of evaporation and hence drying may be enhanced by increasing the air refresh rate in the drying and fixing unit 34. Simultaneously, film formation of the ink occurs, because the prints are heated to a temperature above the minimum film formation temperature (MFT). The residence time of the print in the drying and fixing unit 34 and the temperature at which the drying and fixing unit 34 operates are optimized, such that when the print leaves the drying and fixing unit 34 a dry and robust print has been obtained.

Post Treatment

To increase the print robustness or other properties of a print, such as gloss level, the print may be post treated, which is an optional step in the printing process.

In an embodiment, the prints may be post treated by laminating the prints.

In an embodiment, the post-treatment step comprises a step of applying (e.g. by jetting) a post-treatment liquid onto the surface of the coating layer, onto which the inkjet ink has been applied, so as to form a transparent protective layer on the printed recording medium. In the post-treatment step, the post-treatment liquid may be applied over the entire surface of an image on the recording medium or may be applied only to specific portions of the surface of an image. The method of applying the post-treatment liquid is not particularly limited, and is selected from various methods depending on the type of the post-treatment liquid. However, the same method as used in the coating method of the pre-treatment liquid or an inkjet printing method is preferably used. Of these methods, inkjet printing method is particularly preferable in view of, avoiding contact between the printed image and the used post-treatment liquid applicator; the construction of an inkjet recording apparatus used; and the storage stability of the post-treatment liquid. In the post-treatment step, a post-treatment liquid containing a transparent resin is applied on the surface of a formed image so that a dry adhesion amount of the post-treatment liquid is 0.5 g/m$^2$ to 10 g/m$^2$, preferably 2 g/m$^2$ to 8 g/m$^2$, thereby forming a protective layer on the recording medium. When the dry adhesion amount is less than 0.5 g/m$^2$, almost no improvement in image quality (image density, color saturation, glossiness and fixability) is obtained. When the dry adhesion amount is more than 10 g/m$^2$, it is disadvantageous in cost efficiency, because the dryness of the protective layer degrades and the effect of improving the image quality is saturated.

As a post-treatment liquid, an aqueous solution comprising components capable of forming a transparent protective layer over a recording medium (e.g. a water-dispersible resin, a surfactant, water, and additives as required) is preferably used. The water-dispersible resin comprised in the post-treatment liquid, preferably has a glass transition temperature ($T_g$) of −30° C. or higher, and more preferably in the range of −20° C. to 100° C. The minimum film forming temperature (MFT) of the water-dispersible resin is preferably 50° C. or lower, and more preferably 35° C. or lower. The water-dispersible resin may be radiation curable to improve the glossiness and fixability of the image.

As the water-dispersible resin, for example, an acrylic resin, a styrene-acrylic resin, a urethane resin, an acryl-silicone resin, a fluorine resin and the like are preferably used. The water-dispersible resin can be suitably selected from the same materials as that used for the inkjet ink. The amount of the water-dispersible resin contained, as a solid content, in the protective layer is preferably 1% by mass to 50% by mass. The surfactant comprised in the post-treatment liquid is not particularly limited and may be suitably selected from those used in the inkjet ink. Examples of the other components of the post-treatment liquid include antifungal agents, antifoaming agents, and pH adjustors.

Hitherto, the printing process was described such that the image formation step was performed in-line with the pre-treatment step (e.g. application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image and the step or drying an fixing the printed image are performed. It is, however, preferable to carry out image formation with the above defined in-line image forming method.

Sheet Conveying System

In the example shown in FIG. 1, the carrier belt 12 may be formed by a material, e.g. a plastic film, which has a stiffness that is significantly lower than the stiffness of the metal conveyer belt 14. Nevertheless, since the sheets P are supported on the carrier belt 12 which is itself supported on the conveyer belt 14, the stiffness of the conveyer belt 14 assures a high positional accuracy of the sheets P when they are transported through the various processing stages. Preferably the carrier belt 12 has a relatively high friction coefficient relative to the conveyer belt 14, so that the carrier belt is safely "guided" by the conveyer belt.

In the example shown, the conveyer belt 14 is an endless belt that is passed around two deflection members 36 (preferably rollers) which, in view of the high stiffness of the conveyer belt 14, have a large radius and, correspondingly, only a small curvature that will cause no damage to the conveyer belt even during long term use.

At a downstream end 38 of the conveyer path shown in FIG. 1, the carrier belt 12 extends beyond the deflection roller 36 for the conveyer belt 14 and is passed around a separating member (roller) 40 that has a significantly smaller radius and, consequently, a larger curvature than the deflection member 36. The carrier belt 12 is then passed over a tension roller 42 and back to the bottom side of the deflection member 36, where it joins again with the conveyer belt 14.

At least one of the deflection rollers 36 may be actively driven. Optionally, the separating member 40 may also be actively driven, with a speed that assures that the speed of displacement of the carrier belt 12 is identical to that of the conveyer belt 14.

In another embodiment, the frictional contact between the carrier belt 12 and the conveyer belt 14 may be so large that it is sufficient to actively drive only one of the deflection members 36 or only the separating member 40.

The conveyer belt 14 may be perforated, and a suction box 44 may be disposed below at least a portion of the top section of the conveyer belt 14, so that the carrier belt 12 is firmly sucked against the conveyer belt. Optionally, the carrier belt 12 may be perforated as well, so that the sheets P are sucked against the carrier belt at least in those processing stages where high positional accuracy of the sheets relative to the carrier belt is essential. To that end, the temperature control device 32 shown in FIG. 1 may also be combined with a suction box.

Figure 2:
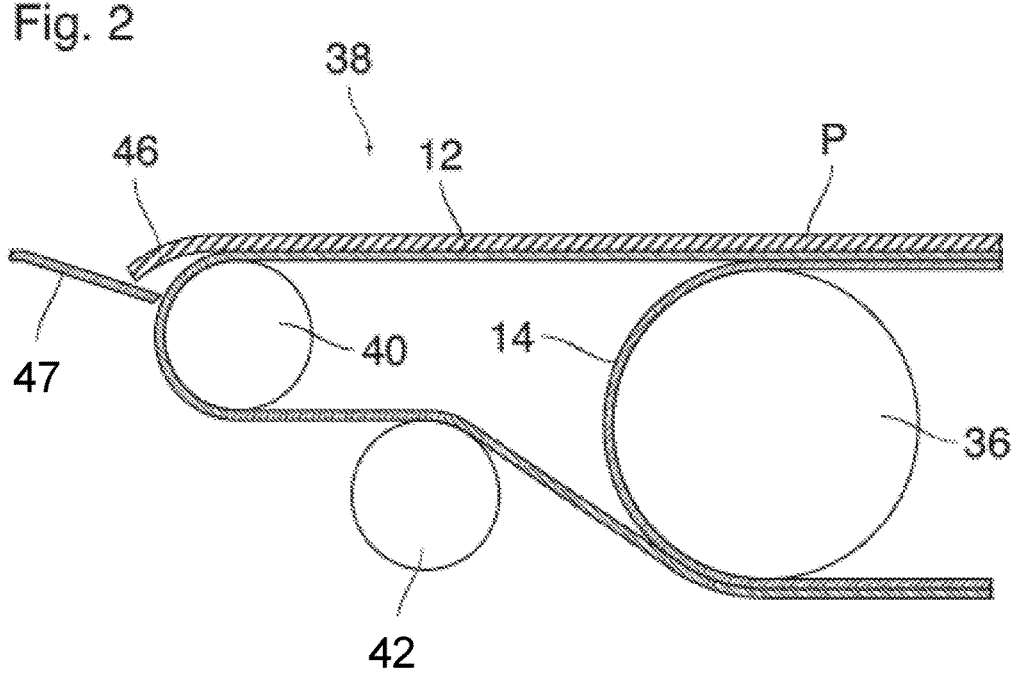
FIG. 2 is an enlarged side view of an end of a conveyer path of the sheet transport system.

FIG. 2 illustrates a situation where one of the sheets P is just about to leave the sheet transport system at the end 38 of the conveyer path. The leading edge 46 of the sheet P is no longer supported by the carrier belt 12 and tends to bend downward. However, due to a certain stiffness of the sheet P, it cannot bend to such an extent that it follows the large curvature of the carrier belt 12 which makes a 180° turn around the deflection member 40. Consequently, the leading edge 46 of the sheet is reliably separated from the carrier belt 12 and guided onto a discharge plate 47.

Figure 3:
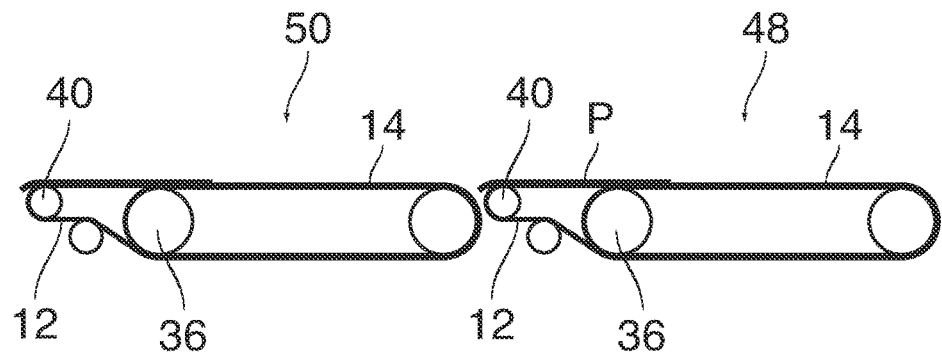
FIG. 3 is a schematic side view of a sheet transport system according to a modified embodiment.

Whereas FIG. 1 shows an embodiment in which the conveyer path is constituted by a single conveyer belt 14, it is also possible to divide the conveyer path into a plurality of subsequent sections 48, 50 as has been shown schematically in FIG. 3. Each of the sections 48, 50 has its own conveyer belt 14 and its own carrier belt 12, and the separating member 40 of section 48 serves to pass on the sheet P to the subsequent section 50.

In principle, each of the processing stages shown in FIG. 1 may have its own conveyer section. This has the advantage that the properties of the conveyer and carrier belts, including the stiffness of the conveyer belt 14, may be optimized for each processing stage.

Even when the sheet P has been wetted by the ink jet marking module 28, the stiffness of the sheet P is still so large that it cannot follow the large curvature of the separating member 40 of the corresponding section, so that the sheet will reliably be separated from the carrier belt and passed on to the subsequent section.

Figure 4:
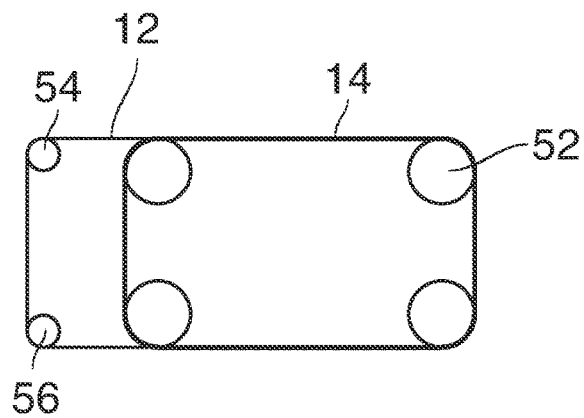
FIGS. 4 and 5 are side views of sheet transport systems according to further embodiments.

The configuration of the deflection and separating members is not limited to the embodiments shown in FIGS. 1 and 3. FIG. 4 shows an example where the conveyer belt 14 is trained around four deflection rollers 52 arranged in quadrangle configuration, and the carrier belt 14 forms an extended loop that is passed over upper and lower rollers 54, 56 which have a smaller diameter. The upper roller 54 serves as a separating member. Although the belt 12 makes only a 90° turn at this separating member, this is sufficient for reliably separating the sheets.

Figure 5:
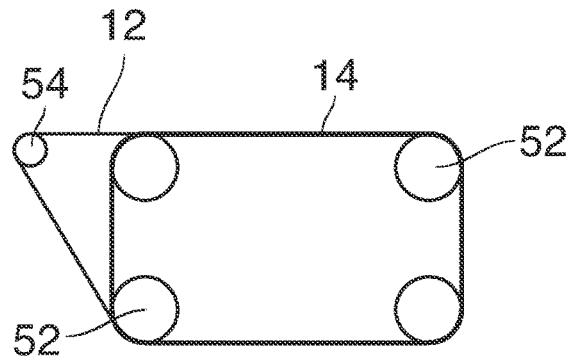

FIG. 5 shows an example which differs from the embodiment shown in FIG. 4 in that the lower small diameter roller 56 has been omitted, so that the carrier belt 12 makes a sharper turn at the separating member 54 and then runs directly to one of the lower deflection rollers 52.

Figure 6:
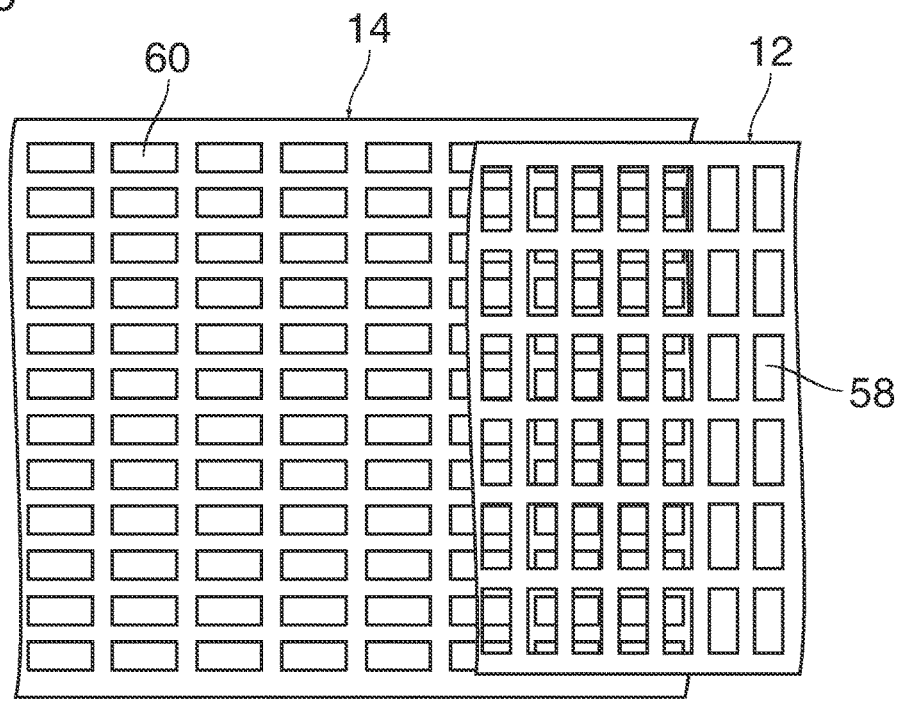
FIG. 6 is a top plan view of a part of a sheet transport system according to an embodiment of the invention.

FIG. 6 is top plan view illustrating an example of perforations 58, 60 formed in the carrier belt 12 and the conveyer belt 14, respectively. When air is drawn in by means of the suction box 44 (FIG. 1), the carrier belt 12 is sucked against the top surface of the conveyer belt 14, so that the friction between the two belts is increased. The patterns of the perforations 58 and 60 are designed such that the individual perforations 58 and 60 overlap, so that a sheet P placed on the carrier belt 12 will be sucked against the carrier belt. In the example shown, this is achieved by a design in which the perforations 58 and 60 have approximately the same size and are elongated in mutually orthogonal directions. In a modified embodiment, the pattern of the perforations 58 in the carrier belt could be finer than the perforations 60 in the conveyer belt 14 or vice versa.

Figure 7:
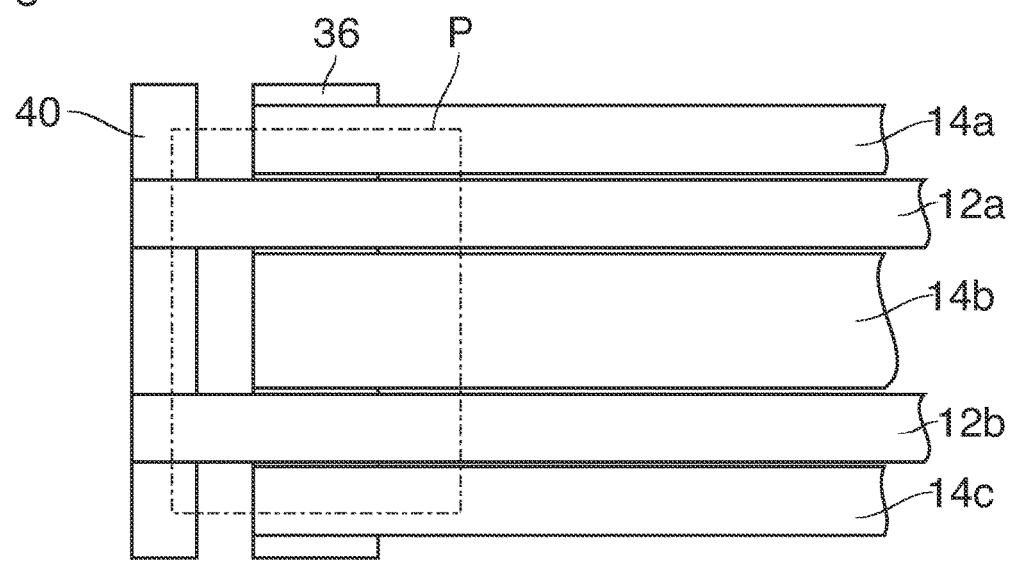
FIG. 7 is a top plan view of an end portion of a conveyer path of a sheet transport system according to yet another embodiment.

In the examples that have been described so far, the carrier belt 12 is superposed on the conveyer belt 14. FIG. 7 shows a modified embodiment in which the carrier belt and the conveyer belt are disposed on the same level so that, together, they form a continuous flat surface. In the example shown, the conveyer belt is formed by three parallel sub-belts 14a, 14b, 14c that are interleaved with two sub-belts 12a, 12b of the carrier belt. The relatively stiff sub-belts 14a, 14c of the conveyer belt form a support surface for the sheet P that is larger than the support surface formed by the sub-belts 12a, 12b of the carrier belt. Consequently, the conveyer belt still assures the positional accuracy of the sheet P. In this example the sheet is supported directly on the conveyer belt and also directly on the carrier belt. When the sheet is leaving the conveyer path, it is carried by the extended portions of the sub-belts 12a, 12b of the carrier belt only, so that the sheet is lifted from the conveyer belt.

In a modified embodiment, the sub-belts 14a-14c could form part of a single conveyer belt having shallow recessed portions that accommodate the sub-belts 12a, 12b of the carrier belt.

In applications where the height of the top surface of the sheets P is less critical, a plurality of thin sub-belts of a carrier belt may be superposed on a single conveyer belt 14 that has a flat top surface.

The invention claimed is:

1. A sheet transport system comprising an endless carrier belt that has a predetermined stiffness and is arranged to carry the sheets towards an end of a conveyer path where the sheet is separated from the carrier belt by passing this belt around a separating member that has a predetermined curvature,
   wherein the carrier belt runs in parallel with an endless conveyer that has a larger stiffness than the carrier belt and, at the end of the conveyer path, has a smaller curvature than the separating member; and
   wherein the conveyer is formed by an endless conveyer belt.

2. The transport system according to claim 1, wherein the carrier belt is superposed on the conveyer.

3. The transport system according to claim 1, wherein the conveyer belt is passed around a deflection roller at the end of the conveyer path, and the carrier belt extends beyond the deflection roller to a separating roller that has the smaller diameter than the deflection roller, and the carrier belt then runs back to the deflection roller where it is joined again with the conveyer belt.

4. The transport system according to claim 3, comprising a tension roller for the carrier belt.

5. The transport system according to claim 1, wherein the conveyer has a metal surface supporting the carrier belt and, directly or indirectly, the sheets.

6. The transport system according to claim 1, wherein the conveyer has a support surface with perforations.

7. The transport system according to claim 6, wherein the carrier belt has perforations.

8. A sheet processing apparatus comprising at least one processing stage arranged on a conveyer path that is formed by at least one sheet transport system according to claim 1.

9. The sheet processing apparatus according to claim 8, wherein said at least one processing stage is an ink jet marking module.

10. The transport system according to claim 1, wherein the conveyer belt is passed around a deflection roller at the end of the conveyer path, and the carrier belt extends beyond the deflection roller to a separating roller that has the smaller diameter than the deflection roller, and the carrier belt then runs back to a further deflection roller where it is joined again with the conveyer belt.

11. The transport system according to claim 10, comprising a tension roller for the carrier belt.

12. A sheet transport system comprising an endless carrier belt that has a predetermined stiffness and is arranged to carry the sheets towards an end of a conveyer path where the sheet is separated from the carrier belt by passing this belt around a separating member that has a predetermined curvature, wherein the carrier belt runs in parallel with an endless conveyer that has a larger stiffness than the carrier belt and, at the end of the conveyer path, has a smaller curvature than the separating member; and wherein the conveyer has a support surface with perforations.

13. The transport system according to claim 12, wherein the carrier belt has perforations.

* * * * *